(12) United States Patent
Umeda

(10) Patent No.: US 7,533,986 B2
(45) Date of Patent: May 19, 2009

(54) TEMPLES OF EYEGLASS FRAME

(75) Inventor: Hidemi Umeda, Fukui (JP)

(73) Assignee: Umeda, Inc., Fukui (JP)

( * ) Notice: Subject to any disclaimer, the term of this patent is extended or adjusted under 35 U.S.C. 154(b) by 0 days.

(21) Appl. No.: 12/003,926

(22) Filed: Jan. 3, 2008

(65) Prior Publication Data
US 2008/0225225 A1 Sep. 18, 2008

(30) Foreign Application Priority Data
Mar. 12, 2007 (JP) ............................. 2007-1585 U

(51) Int. Cl.
G02C 5/16 (2006.01)
(52) U.S. Cl. .................. 351/114; 351/119; 351/121; 351/153
(58) Field of Classification Search ......... 351/111–121, 351/153; 16/228
See application file for complete search history.

(56) References Cited
U.S. PATENT DOCUMENTS
5,682,222 A 10/1997 Chao
7,422,323 B2 * 9/2008 Saitoh et al. ................ 351/153

FOREIGN PATENT DOCUMENTS
JP 2001-290108 10/2001

* cited by examiner

Primary Examiner—Huy K Mai
(74) Attorney, Agent, or Firm—Wenderoth, Lind & Ponack, L.L.P.

(57) ABSTRACT

Each of temples of an eyeglass frame includes a first and second temple portions rotatably coupled together via a second joint, an axis of the second joint coupling the first and second temple portions together is disposed on either an inner side or an outer side of a center of a width of the temple, and opposing surfaces are formed at ends of the first and second temple portions forming the second joint, the opposing surfaces being formed on either an outer side or an inner side of the axis intersecting the axial direction of the temple, and magnets are mounted in the opposing surfaces, and a gap is formed between the opposing surfaces or in surfaces on an outer side of the second joint, enabling the temples to be further pushed open outward by only a small angle in a state opened due to the first joint.

4 Claims, 3 Drawing Sheets

TEMPLES OF EYEGLASS FRAME

BACKGROUND OF THE INVENTION

1. Field of the Invention

This invention relates to temples of an eyeglass frame, the temples being foldably coupled to the eyeglass frame via joints and being allowed to be further slightly opened outward from the state opened due to the joints owing to action of magnetic force.

2. Prior Art

A joint that works to slightly push open a temple of an eyeglass frame in a state where it is opened is called a spring hinge, and is much used as means for coupling the temples to the eyeglass frame. For example, a "coupling structure" according to JP-A-2001-290108 is designed to couple the temples of the eyeglass frame to the endpieces in a manner to rotate relatively, wherein an end of the temple is branched into a fork to form a pair of piece members maintaining a gap in the horizontal direction, the piece members are pierced, extending grooves opposing each other are formed in the piece members along the lengthwise direction of the temple, an urging member is held between the opposing grooves, and a moving member is attached to the urging member so as to be urged to the endpiece by the urging force of the urging member and to move in the gap of the temple.

The temple in the opened state is constituted to be pushed open outward by the urging force of the spring in the return direction. For this purpose, a coil spring is used. That is, the spring force is produced by compressively deforming the coil spring, and as a result, it requires a slide member for compressively deforming the coil spring. However, infiltration of dust and occurrence of rust hinder the slide motion of the slide member and the temple often fails to be smoothly opened. Moreover, the hinge incorporating a coil spring is complex in the structure, and accordingly it is fabricated through an increased number of steps and becomes expensive. Further, the complex structure is liable to become broken down. Once broken down, it must be repaired but the repair is difficult due to the complex. Moreover, the spring hinge can be applied to metallic temples but cannot be applied to plastic temples.

In order to solve the above problems, there has been known an eyeglass frame incorporating magnets to exhibit the same function as that of the spring hinge (see U.S. Pat. No. 5,682,222 entitled "SPECTACLE FRAME HAVING MAGNETIC COUPLING"). According to the above invention, one end side of the temple rotatably coupled to the endpiece via a joint is extended from the joint portion on the outer side surface of the endpiece in parallel in the direction of rim, and the end of the temple and the endpiece are attracted by each other by using magnets. Since the end of the temple is overlapped on the endpiece, the end of the endpiece has a pivot shaft at a protruded portion that protrudes outward. Further, an elongated hole is formed in the corresponding portion of the temple to which the pivot shaft fits, and the temple that is opened can be further pushed open outward. In the above eyeglass frame, if the temple is pushed open outward, a triangular gap forms between the endpiece and the end of the temple. Here, however, the opposing magnets attract each other so as to eliminate the gap between the endpiece and the end of the temple, i.e., so as to pull the temple that is pushed open back to its initial position.

In the above eyeglass frame having magnetic coupling, however, since one end side of the temple is overlapped on the outer side surface of the endpiece, the two side portions of the rims become thick and swell sideways. Therefore, limitation is imposed from the standpoint of aesthetic appearance. Besides, in a state where the temples are folded, the ends of the temples on the joint side protrudes toward the outer side of the joints, resulting in an increase in the width correspondingly and requiring an increased space for accommodation arousing such a problem that an eyeglass casing of an increased size is necessary.

SUMMARY OF THE INVENTION

In order to solve the above problems inherent in the prior art, it is an object of the present invention to provide temples of an eyeglass frame of a very simple and compact structure using magnets without imposing limitation on the material of the temples, without impairing aesthetic appearance and having the same function as that of the traditional spring hinge.

Temples of an eyeglass frame according to the invention are foldably attached, via first joints, to endpieces on both sides of a front portion of a pair of rims; wherein each temple includes a first temple portion and a second temple portion rotatably coupled together via a second joint; an axis of the second joint coupling the first and second temple portions together is disposed on either an inner side or an outer side of a center of a width of the temple, and opposing surfaces are formed at ends of the first and second temple portions forming the second joint, the opposing surfaces being formed on either an outer side or an inner side of the axis intersecting the axial direction of the temple; and magnets are mounted in the opposing surfaces, and a gap is formed between the opposing surfaces or in surfaces on an outer side of the second joint, enabling the temples to be further pushed open outward by only a small angle in a state opened due to the first joint.

When the axis of the second joint that is coupling the first temple portion and the second temple portion together is disposed on the inner side of the center of the width of the temple, the opposing surfaces are formed on the outer side of the second joint, a gap is formed between the opposing surfaces enabling the second temple portion to be folded outward by only a small angle, and the magnets are mounted in the opposing surfaces in a manner that the same poles are opposed to each other. In a state where the temples are opened via the first joint to wear the spectacles, the magnets mounted in the opposing surfaces are so arranged that the same poles are opposed to each other. Therefore, the magnets repel each other, and the first temple portion and the second temple portion extend straight without being folded. In this state, the second temple can be further pushed open outward; i.e., the second temple is folded outward by the amount of gap between the opposing surfaces. In a state of being worn, a mild urging force is produced inward.

When the axis of the second joint that is coupling the first temple portion and the second temple portion together is disposed on the outer side of the center of the width of the temple, the opposing surfaces are formed on the inner side of the second joint, the magnets are mounted in the opposing surfaces in a manner that the different poles are opposed to each other, contact surfaces are formed at the ends of the first temple portion and the second temple portion on the outer side of the second joint so as to prevent them from turning, and a gap is formed between the two contact surfaces enabling the second temple portion to be folded outward by only a small angle. Here, since the opposite poles are opposed to each other, the opposing surfaces are normally attracted by each other and come in contact together. Therefore, the first temple portion and the second temple portion extend straight without being folded. In this state, the second temple can be further pushed open outward; i.e., the second temple is folded outward by the amount of gap between the ends of the first temple portion and the second temple portion on the outer side of the second joint. In a state of being worm, a mild urging force is produced inward.

When the axis of the second joint that is coupling the first temple portion and the second temple portion together is disposed on the inner side of the center of the width of the temple, stopper surfaces are formed facing each other on the first temple portion and the second temple portion on the inner side of the second joint that couples the first temple portion and the second temple portion together, preventing the second temple portion from being folded inward alone.

The temples of the eyeglass frame of the invention is constituted as described above. Namely, the first temple portion and the second temple portion are allowed to turn via the second joint, and opposing surfaces equipped with magnets are formed on the inner side or on the outer side of the axis of the second joint, enabling the temple to be further pushed open outward by only a small angle in the state opened due to the first joint. Thus, the invention provides temples of an eyeglass frame of a very simple and compact structure without impairing aesthetic appearance and having the same function as that of the traditional spring hinge. The temples are not only very simple in the structure but also can be easily produced by using either a synthetic resin or a metal.

DETAILED DESCRIPTION OF THE PREFERRED EMBODIMENTS

Figure 1:
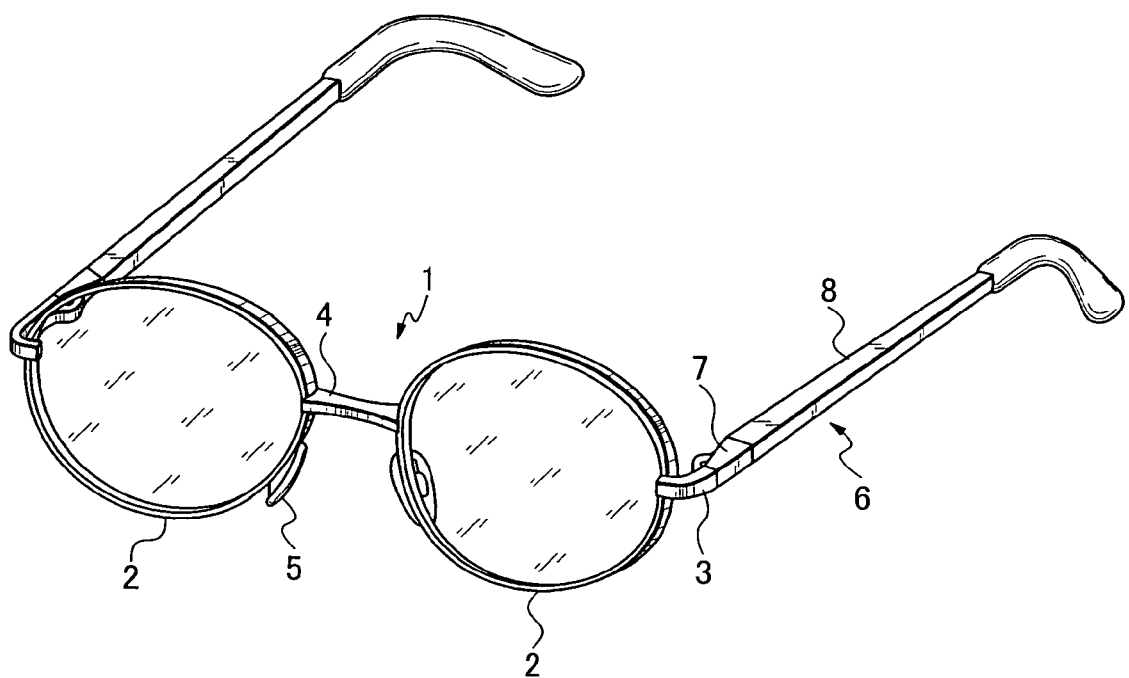
FIG. 1 is a perspective view showing an eyeglass frame provided with temples according to the invention.

FIG. 1 shows an eyeglass frame having a structure for coupling temples according to the invention, which is comprised of a front portion 1 having rims 2 to which lenses are fitted, endpieces 3, a bridge 4 and nose pads 5, and temples 6. The two rims 2 and 2 are connected together by the bridge 4. The endpieces 3 and 3 are formed nearly in an L-shape and brazed to both sides of the front portion 1. The temples 6 and 6 are foldably attached to the endpieces 3 and 3.

Figure 2A:
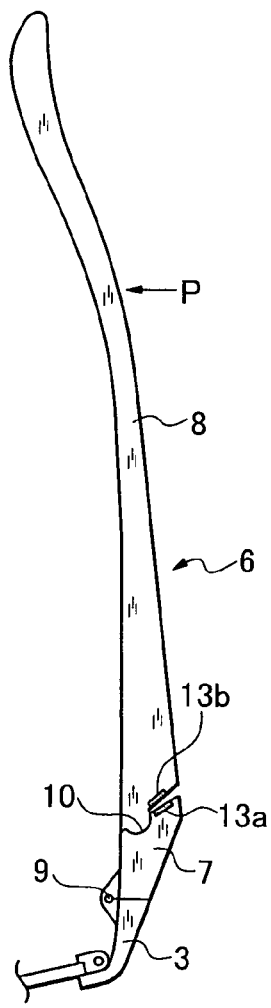
FIGS. 2A and 2B are a plan view and a disassembled perspective view of the temple according to a first embodiment of the invention.
Figure 2B:
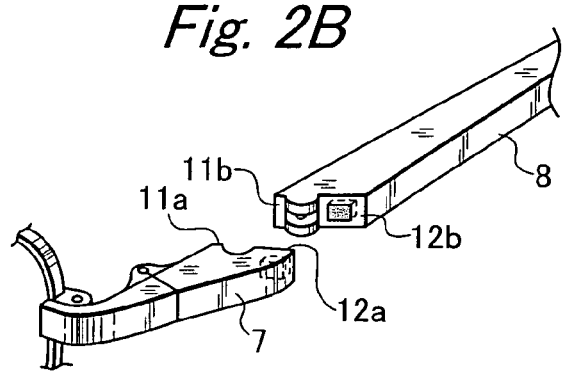

Referring to FIGS. 2A and 2B, each temple 6 is attached to the endpiece 3 via a hinge 9 (a first joint), i.e. the temple 6 has a joint structure which enables it to be folded. The temple 6 includes a first temple portion 7 and a second temple portion 8 which are coupled together via a second joint 10. A stopper surface 11a is formed on the first temple portion 7 on the inside of the second joint 10, and a stopper surface 11b is formed on the second temple portion 8 so as to be opposed to the stopper surface 11a. The two stopper surfaces 11a and 11b come in contact with each other preventing the second temple portion 8 from turning inward alone.

An opposing surface 12a is formed on the first temple portion 7 on the outer side of the second joint 10 and an opposing surface 12b is formed on the second temple portion 8 opposite to the opposing surface 12a. Recessed portions are formed in the opposing surfaces 12a and 12b at positions corresponding to each other, and magnets 13a and 13b are mounted therein in flush with the opposing surfaces 12a and 12b. Here, the magnets 13a and 13b are so arranged that the same poles are opposed to each other, i.e., the two magnets 13a and 13b repel each other. In a state where the two stopper surfaces 11a and 11b are in contact with each other as shown in FIG. 2A, a gap is formed between the two opposing surfaces 12a and 12b in a shape that is opened outward by only a small angle. That is, the second temple portion 8 is coupled, via the second joint 10, to the first temple portion 7 in a manner of being allowed to be folded outward by the above angle overcoming the repulsive force of the magnets.

If a pushing force P is given from the outer side to the second temple portion 8 of the temple 6 constituted as above, the temple 6 is folded as a whole via the hinge 9. That is, the second temple portion 8 can be folded outward by the amount of gap between the opposing surfaces 12a and 12b but is not allowed to fold inward via the second joint 10. Namely, the temple 6 as a whole can be folded via the hinge 9. In the state where the temple 6 is opened due to the hinge 9 (the first joint) as shown in FIG. 2A, the first temple portion 7 comes in contact with the endpiece 3 and cannot be folded outward any more. In this state, if an outward force is given to the second temple portion 8, then the second temple portion 8 is folded outward by the amount of gap between the opposing surfaces 12a and 12b via the second joint 10. If the second temple portion 8 is folded outward, the magnets 13a and 13b mounted in the opposing surfaces 12a and 12b approach each other producing an increased repulsive force and, therefore, producing a force (magnetic force) for pushing the second temple portion 8 back. That is, a mild urging force affects inward like with the conventional spring hinge.

Figure 3A:
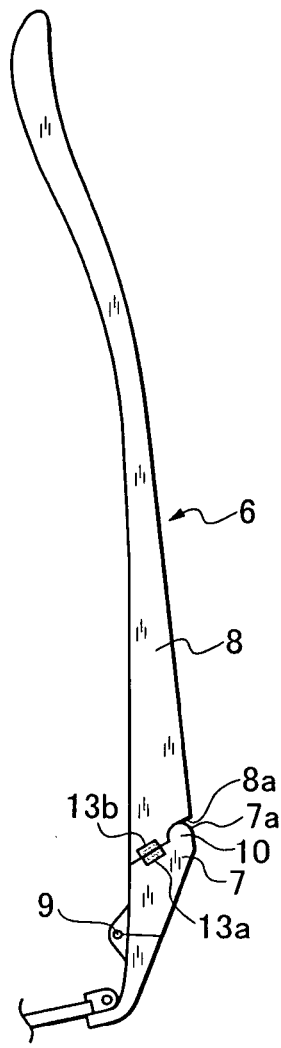
FIGS. 3A and 3B are a plan view and a disassembled perspective view of the temple according to a second embodiment of the invention.
Figure 3B:
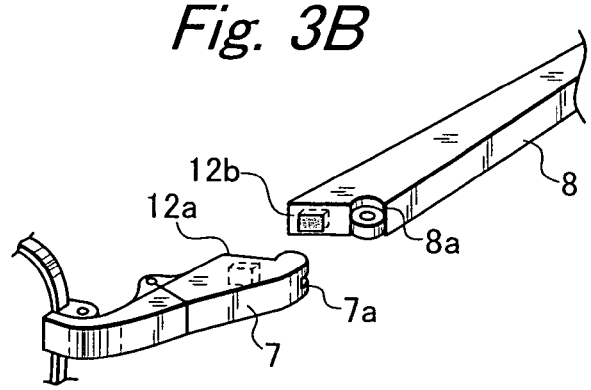

FIGS. 3A and 3B illustrate a temple 6 according to another embodiment. The temple 6 has a structure that is basically common to that of the embodiment shown in FIG. 2A and 2B, but is different with respect to that the second joint 10 and the magnets 13a, 13b are arranged inside out and that the polarities of the magnets are not the same. That is, the second joint 10 is arranged on the outer side of the temple 6, and the magnets 13a and 13b are arranged on the inner side of the second joint 10. Recessed portions are formed in the opposing surface 12a at the end of the first temple portion 7 on the inner side of the second joint 10 and in the opposing surface 12b of the second temple portion 8 opposed to the opposing surface 12a at positions corresponding to each other, and the magnets 13a and 13b are mounted therein in flush with the opposing surfaces 12a and 12b. Here, the two magnets 13a and 13b are so mounted that different poles are opposed to each other. Further, contact surfaces 7a and 8a are formed at the ends of the first temple portion 7 and the second temple portion 8 on the outer side of the second joint 10 preventing them from turning. In a state where the opposing surfaces 12a and 12b are in contact with each other, a gap is formed between the contact surfaces 7a and 8a, and the second temple portion 8 is allowed to be turned outward by only the angle of gap.

According to such constitution as described above, in the state where the temple 6 is opened due to the hinge 9 (the first joint), the two magnets 13a and 13b are brought in contact with each other due to the attractive magnetic force (see FIG. 3A). In such an opened state, at the time of folding, the temple 6 is folded via the hinge 9. If the temple 6 is further pushed open outward, the magnets 13a and 13b that are in contact with each other separate away from each other, and the second temple portion 8 is folded outward via the second joint 10 by only the gap between the contact surfaces 7a and 8a. Thus, if the force is applied outward, the magnets 13a and 13b being in contact with each other separate away from each other. Here, however, the attractive magnetic force is acting at all times and the second temple portion 8 is urged to be returned inward. That is, when wearing, a mild urging force is produced inward like with the temples equipped with the traditional spring hinges despite of a simple constitution.

What is claimed is:

1. Temples of an eyeglass frame, which are foldably attached, via first joints, to endpieces on both sides of a front portion of a pair of rims; wherein
    each temple includes a first temple portion and a second temple portion rotatably coupled together via a second joint;
    an axis of the second joint coupling the first and second temple portions together is disposed on either an inner side or an outer side of a center of a width of the temple, and opposing surfaces are formed at ends of the first and second temple portions forming the second joint, the opposing surfaces being formed on either an outer side or an inner side of the axis intersecting the axial direction of the temple; and
    magnets are mounted in the opposing surfaces, and a gap is formed between the opposing surfaces or in surfaces on an outer side of the second joint, enabling the temples to be further pushed open outward by only a small angle in a state opened due to the first joint.

2. Temples of an eyeglass frame according to claim 1, wherein the axis of the second joint coupling the first temple portion and the second temple portion together is disposed on the inner side of the center of the width of the temple, the opposing surfaces are formed on the outer side of the second joint, a gap is formed between the opposing surfaces enabling the second temple portion to be folded outward by only a small angle, and the magnets are mounted in the opposing surfaces in a manner that the same poles are opposed to each other.

3. Temples of an eyeglass frame according to claim 2, wherein stopper surfaces are formed facing each other on the first temple portion and the second temple portion on the inner side of the second joint that couples the first temple portion and the second temple portion together, preventing the second temple portion from being folded inward alone.

4. Temples of an eyeglass frame according to claim 1, wherein the axis of the second joint coupling the first temple portion and the second temple portion together is disposed on the outer side of the center of the width of the temple, the opposing surfaces are formed on the inner side of the second joint, the magnets are mounted in the opposing surfaces in a manner that the different poles are opposed to each other, contact surfaces are formed at ends of the first temple portion and the second temple portion on the outer side of the second joint so as to prevent them from turning, and a gap is formed between the two contact surfaces enabling the second temple portion to be folded outward by only a small angle.

* * * * *